G. W. BLAKE.
POURING SPOUT.
APPLICATION FILED APR. 15, 1913.
1,093,600.
Patented Apr. 21, 1914.
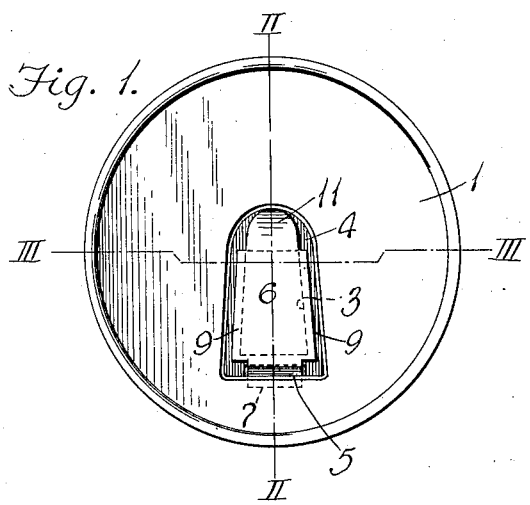
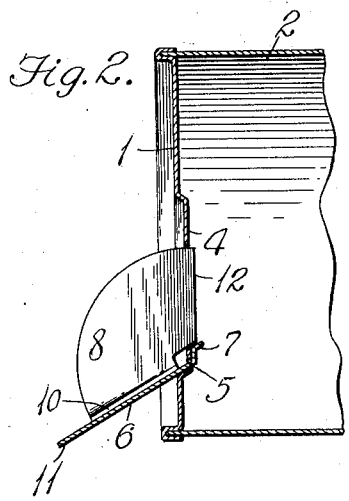
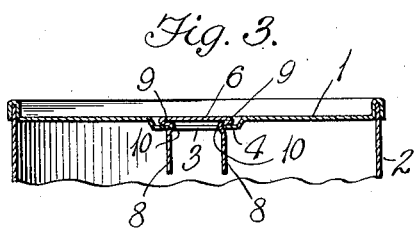
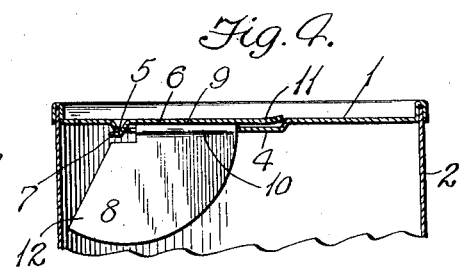
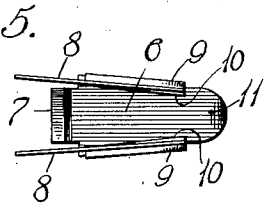
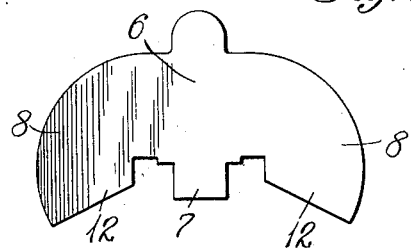
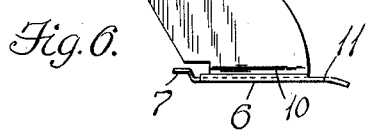
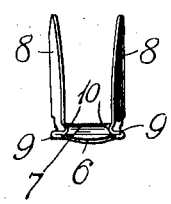
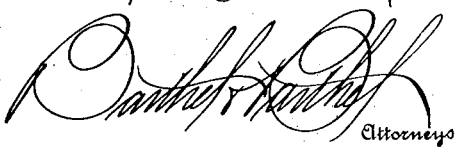

UNITED STATES PATENT OFFICE.

GEORGE W. BLAKE, OF WYANDOTTE, MICHIGAN.

POURING-SPOUT.

1,093,600.  Specification of Letters Patent.  Patented Apr. 21, 1914.

Application filed April 15, 1913. Serial No. 761,212.

*To all whom it may concern:*

Be it known that I, GEORGE W. BLAKE, a citizen of the United States of America, residing at Wyandotte, in the county of Wayne and State of Michigan, have invented certain new and useful Improvements in Pouring-Spouts, of which the following is a specification, reference being had therein to the accompanying drawings.

In receptacles for salt or like granular substances or powders in which means are provided for pouring the same through the cover it is desirable that whatever devices are employed in the shape of spouts or the like be so arranged as to seal the package tightly when not in use and at the same time to permit the entire contents of the receptacle to be poured out without difficulty.

This invention relates to a pouring spout for a receptacle and to an arrangement thereof whereby the receptacle is tightly closed when the spout is not in use and whereby the contents thereof can be entirely poured out without difficulty.

The invention consists in the matters hereinafter set forth and particularly pointed out in the appended claims.

In the drawings, Figure 1 is a plan view of the head of a receptacle that is equipped with a pouring spout embodying features of the invention, showing the spout in closed position; Fig. 2 is a view in section on line II—II of Fig. 1 showing the spout open; Fig. 3 is a view on line III—III of Fig. 1 showing the spout closed; Fig. 4 is a view on line II—II of Fig. 1 showing the spout closed; Figs. 5, 6 and 7 are views in detail of the spout before it is connected with the cover of the receptacle; and Fig. 8 is a view of one form of blank from which the spout may be formed.

Referring to the drawings, a cover 1 of the receptacle 2 has an opening indicated by dotted lines at 3 which preferably is struck out of an inset portion 4 of the cover. The margins of the opening are slightly convergent. A hinge slot 5 is formed in the cover parallel with the adjacent end margin of the opening. A pouring spout formed of sheet metal blank or like suitable material has a body 6 from one end of which a laterally off-set tongue 7 projects. The latter is adapted to pass through the slot 5 and underlie the cover, and when the spout is turned out as indicated in Fig. 2, the off-set hinge tongue bears against the strip of metal between the slot 5 and the main opening and holds the spout in inclined position. Sides 8 are bent up from the spout and each have a curved outer margin whose center is approximately coincident with the center of motion of the spout when it is swung in the slot 5. The sides 8 are turned up from infolded portions 9 of the body which act as stiffening ribs and as flanges that overlie the side margins of the main opening when the spout is in closed position as indicated in Fig. 1. Preferably the lines on which the sides are folded are slightly less convergent than the adjacent margins of the opening. An off-set band 10 at the junction or angle of the side 8 and reverted portion 9 forms a groove into which the margin of the cover snaps when the spout is in closed position, thereby locking it against accidental displacement. To facilitate the opening of the spout a finger pull portion 11 extends from the pouring end of the spout and may be slightly outbent as indicated in Fig. 6. The rear margin 12 of each side is so disposed as to allow the hinge 7 to be inserted in a slot that is comparativley close to the side of the receptacle cover so that the contents of the receptacle may be readily poured through the spout without having to shake the receptacle as would be the case if the spout were near the center of the head.

As a result of this construction the spout forms a practically air tight closure when not in use. When drawn out, the sides form adequate means for directing the material to the delivery end and likewise act to hold the spout in place as their outwardly divergent end portions are pressed in by frictional engagement with the sides of the opening as the spout is turned outwardly. The difference in divergence between the lines on which the sides are folded up and the adjacent margins of the opening increases the frictional effect so that the sides may act as means for holding the spout at any pouring angle. As the rear margins of the sides are substantially parallel to the inside of the receptacle cover, as indicated in Fig. 2, they do not interfere with the movement of the powder or other contents of the receptacle into the spout.

What I claim is:—

1. The combination of a receptacle and a cover therefor having a pouring opening and a hinge slot adjacent one end of the opening, with a pouring spout having an off-set hinge tongue adapted to engage in the hinge slot and to limit the movement of the spout in one direction and sides on the spout adapted to yieldingly bear against the margins of the opening when the spout is in pouring position and inset adjacent to the body of the spout to interlock with said margins when the spout is closed against the cover.

2. The combination of a receptacle and a cover with pouring opening therethrough having convergent lateral margins and a hinge slot adjacent the wider end of the opening, of a pouring spout having an off-set hinge tongue adapted when passed through the slot to bear upwardly against the inner face of the cover to limit the movement of the spout in one direction and sides bent up from the body of the spout along convergent lines whereby the sides yieldingly bear against the convergent margins of the opening when the spout is out-turned, the sides being inset adjacent to the cover to interlock with the margins of the opening when the spout is closed.

3. The combination of a receptacle and a cover with pouring opening therethrough having convergent lateral margins and a hinge slot adjacent the wider end of the opening, of a pouring spout having an off-set hinge tongue adapted when passed through the slot to bear upwardly against the inner face of the cover to limit the movement of the spout in one direction and sides bent up from the body of the spout along convergent lines whereby the sides yieldingly bear against the convergent margins of the opening when the spout is out-turned, the sides being inset adjacent to the cover to interlock with the margins of the opening when the spout is closed, and having curvilinear margins whose centers of curvature are substantially co-incident with the center of motion of the spout on the hinge tongue, whereby they extend for substantially the entire length of the pouring opening in all positions of the spout.

4. The combination of a receptacle and a cover therefor with pouring opening and hinge slot adjacent one end of the opening, with a pouring spout having an off-set hinge tongue at one end adapted to engage the hinge slot and to limit the movement of the spout in one direction, the body of the spout being reverted whereby flanges are formed to overlie the cover along the margins of the pouring opening when the spout is closed and being out-bent beyond the lines of reversion, the resultant sides bearing frictionally against the margins of the opening when the spout is out-turned and being inset along the lines of bending to interlock with the cover when the spout is closed.

5. The combination of a receptacle and a cover therefor with pouring opening therethrough having rectilinear lateral margins and a hinge slot adjacent one end of the opening, with a pouring spout of spring sheet material having an off-set hinge tongue at the inner end adapted to engage the hinge slot, and sides outbent from the body along lines non-coincident with the lateral margins of the opening whereby the sides frictionally engage the margins when the spout is in open position, the body of the spout being reverted beyond the sides to form flanges that overlie the margins of the opening when the spout is closed and the sides being inset adjacent the lines of bending to interlock with the cover when the spout is closed, and a finger pull on the spout opposite the hinge, the portion of the cover in which the opening of the spout is formed being in-set from the face of the cover body.

6. The combination of a receptacle and a cover therefor having a pouring opening and a hinge slot adjacent one end of the opening, with a pouring spout having a hinge tongue adapted to engage in the hinge slot and to limit the movement of the spout in one direction and sides on the spout adapted to yieldingly bear against the margins of the opening when the spout is in pouring position.

In testimony whereof I affix my signature in presence of two witnesses.

GEORGE W. BLAKE.

Witnesses:
ANNA M. DORR,
C. R. STICKNEY.